(12) United States Patent
Ogasawara

(10) Patent No.: US 6,513,015 B2
(45) Date of Patent: *Jan. 28, 2003

(54) SYSTEM AND METHOD FOR CUSTOMER RECOGNITION USING WIRELESS IDENTIFICATION AND VISUAL DATA TRANSMISSION

(75) Inventor: Nobuo Ogasawara, San Diego, CA (US)

(73) Assignee: Fujitsu Limited (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,921

(22) Filed: Sep. 25, 1998

(65) Prior Publication Data
US 2002/0016740 A1 Feb. 7, 2002

(51) Int. Cl.[7] .................................................. G06F 17/60
(52) U.S. Cl. .......................... 705/26; 235/322; 340/643
(58) Field of Search ........................... 705/26; 235/372; 340/828, 643, 825

(56) References Cited

U.S. PATENT DOCUMENTS

| | | | |
|---|---|---|---|
| 4,797,543 A | 1/1989 | Watanabe | 235/492 |
| 4,822,990 A | 4/1989 | Tamada et al. | 235/492 |
| 4,888,709 A | 12/1989 | Revesz et al. | 364/518 |
| 4,965,802 A | 10/1990 | Shinagawa | 371/51.1 |

(List continued on next page.)

FOREIGN PATENT DOCUMENTS

| | | | | |
|---|---|---|---|---|
| EP | 0 636 993 A1 | 2/1995 | | |
| EP | 0 649 109 A1 | 4/1995 | | |
| JP | 06223088 A | 8/1994 | | |
| JP | 8 96041 | 4/1996 | | |
| WO | WO 98/10094 | * | 4/1998 | G06F/17/60 |
| WO | WO 98/18094 | | 4/1998 | |
| WO | WO98/38589 | * | 9/1998 | G06F/17/60 |

OTHER PUBLICATIONS

Halverson Richard–"Caldor Renovates Second Unit–Improves Traffic Flow"–Discount Stopre News v.36n23 pp 5,101 Dec. 8, 1997.*

Ousnamer Mark–"Ergonomic Solutions Start With Good Data"–IIE Solutions v30n3 pp 18–22 Mar. 1998.*

Primary Examiner—Vincent Millin
Assistant Examiner—Geoffrey Akers
(74) Attorney, Agent, or Firm—Christie, Parker & Hale, LLP

(57) ABSTRACT

An electronic shopping system, providing for customer recognition using wireless identification and visual data transmission to point-of-sale terminals and other terminal types located in a commercial establishment. A customer's visual image is taken as a customer enters the establishment and, that customer's identification number is obtained from a customer identification card, if the customer possesses such a card. The visual image data is bundled with the customer's demographic profile data, transaction history data and the customer's current accrued store loyalty or incentive points into a customer data record. The customer data record is forwarded to point-of-sale terminals, store workstations, mobile terminals, or other I/O devices capable of displaying multiple customer records. The establishment staff is able to access each of the customer records in order to visually identify customers as they enter the establishment, without the customers needing to announce themselves or otherwise advertise their presence. A customer's visual image can also be acquired as a customer accesses a check-in kiosk terminal prior to beginning a shopping excursion. The acquired customer visual image is bundled with customer preference data and made available to the establishment's staff for visual recognition of each individual customer.

30 Claims, 5 Drawing Sheets

U.S. PATENT DOCUMENTS

| | | | |
|---|---|---|---|
| 5,250,789 A | 10/1993 | Johnsen | 235/383 |
| 5,397,883 A | 3/1995 | Miyashita | 235/382 |
| 5,541,583 A | 7/1996 | Mandelbaum | 340/825.54 |
| 5,559,313 A | 9/1996 | Claus et al. | 235/380 |
| 5,572,653 A | 11/1996 | DeTemple et al. | 395/501 |
| 5,614,703 A * | 3/1997 | Martin et al. | 235/382 |
| 5,631,631 A | 5/1997 | Deshenes | 340/572 |
| 5,640,002 A * | 6/1997 | Ruppert et al. | 235/472 |
| 5,694,514 A | 12/1997 | Evans et al. | |
| 5,745,036 A | 4/1998 | Clare | 340/572 |
| 5,751,885 A | 5/1998 | O'Loughlin et al. | |
| 5,887,259 A * | 3/1999 | Zicker et al. | 455/434 |
| 5,914,671 A * | 6/1999 | Tuttle | 340/825.54 |
| 5,946,444 A * | 8/1999 | Evans | 386/46 |
| 6,012,051 A * | 1/2000 | Sammon, Jr. et al. | 706/52 |
| 6,097,301 A * | 8/2000 | Tuttle | 340/693.9 |

* cited by examiner

SYSTEM AND METHOD FOR CUSTOMER RECOGNITION USING WIRELESS IDENTIFICATION AND VISUAL DATA TRANSMISSION

FIELD OF THE INVENTION

The present invention relates generally to electronic systems for facilitating point-of-sale retail transactions and, more particularly, to a computer based shopping system which uses a wireless ID card or tag and a videograph of an identified customer to provide customer recognition information to in-store terminals

BACKGROUND OF THE INVENTION

Contemporary retail stores compete fiercely to establish and maintain the store loyalty of their present customers and to attract new customers to their stores by offering various degrees of personalized service which is adapted to meet the particular expectations and needs of each member of a highly diversified clientele. Establishing personalized service, matched to a particularized customer base, particularly in large department stores, requires the taking and maintaining of large amounts of data and the processing of such data so as to compile a shopping profile of each customer.

Most modern retail stores implement some form of computerization or electronic technology in their operations. This typically consists of using point-of-sale (POS) systems for automating checkout procedures and for assisting sales personnel to improve the efficiency of one-to-one merchandising and customer assistance. POS systems generally include one or more automated check-out terminals which are capable of sensing and interpreting a Universal Product Code (UPC) which is printed or tagged on each item of merchandise to be purchased. Conventionally, a POS terminal, a kiosk terminal or a sales person's hand-held terminal is coupled to a computer system which recognizes and processes the UPC information. The database, accessible by the computer system, includes a list of merchandise items stocked by the store, a UPC for each of these items, and various types of merchandise identification information, including pricing, inventory, style, color, etc., associated with each UPC. When a customer is ready to make a purchase, a store clerk might use an automated POS terminal to read the UPC markings on each of the customer's selections. The computer interprets the UPC, accesses the database to determine the price for each item and maintains a running total of the purchase price.

Many stores also use computerized systems to convey pricing and other information about its merchandise to its customers and to acquire information about the kinds of merchandise purchased by a customer. Frequencies of purchase, the effect of advertising and in-store promotional activities, and other indicia of a customer's shopping habits. A retail store might use this information in order to control the costs of providing personalized services and products to its customers and to provide increased convenience and flexibility to the shopping experience.

Use of customer transaction information additionally might allow a retail store to establish and maintain a shopping history record of purchases by particular customers so as to award loyalty or incentive points to a customer based on the amount and frequency of their transactions. For example, a threshold number of loyalty or incentive points might qualify a customer for participation in a discount program or some similar promotion, in a manner similar to airlines awarding frequent-flyer mileage points for repeat customers. To improve the efficiency of a store's one-to-one marketing efforts, a retailer often issues a "loyalty" card (customer ID card) to customers which are then requested to present that card during each shopping visit to the retailer.

However acquired, and however used, customer data is conventionally captured during purchase transactions at one or more of a retail store's POS terminals. The data might be transferred to a store platform computer system where it is processed and appended to a particular customer's shopping transaction history. Incentive or loyalty points might be awarded based on the total dollar volume of the transaction. Coupon codes might be analyzed for applicability and the purchase of promotional items might be analyzed to determine the effectiveness of recent advertising. An updated transaction record, including any loyalty or incentive point award, is provided to the POS terminal for immediate applicability to a customer's purchases.

However, electronic shopping systems based on customer ID cards or data cards are most often configured such that the card is presented at a check out terminal in order to record the transaction and allocate any discounts or loyalty or incentive points to the appropriate customer. Accordingly, customer ID or data cards are only used to enhance the efficiency of a retail transaction after a customer has already selected which items they might wish to buy and has already made the purchase decision. Any customer loyalty or incentive system established by the retailer is only able to recognize a particular customer ID card at the checkout counter and could only contain information about items already considered for purchase.

Because of this inherent disadvantageous feature of contemporary ID or data card based electronic shopping systems, store clerks are not able to provide efficient shopping advice and personalized shopping assistance to customers because the store clerks do not have ready access to a particular customer's transaction history until that customer presents their ID card at a checkout terminal. In order to provide shopping advice and personalized assistance, a store clerk must remember a customer's face and be able to recall that customer's merchandise preferences and some indication of recently purchased items.

In the case of large dollar volume purchasers (VIP customers) a retail store manager might want to personally assist that customer and host the customer's store visit from initially greeting the customer as they enter the store to facilitating their purchase transactions when they are ready to leave. However, it is very difficult to greet such a customer when they arrive at the store in the absence of any advance notice. It is also very difficult to locate such a customer within a store, particularly when the store is very large and has a multiplicity of floors and departments.

Many specialty retail stores attempt to resolve the difficult problem of identifying VIP customers at their time of arrival by stationing specially trained "greeters" at each of the entrances to the stores. Greeters are familiarized with various customers' faces and are able to alert management when a recognized VIP customer enters the store. A store or department manager might then choose to personally assist the VIP customer or, alternatively, introduce the customer to a particularly effective member of the sales force for further personalized service. This type of customer recognition approach, however, is extremely labor intensive and also rather inefficient. Customers can easily be overlooked during a busy period or might be overlooked by a temporary mental lapse on the part of a greeter.

Some retail stores have established an alternative method for recognizing the presence of certain customer types within a facility by establishing wireless customer ID interrogator units at various locations throughout the facility. As a particular customer enters the radiation field established by an interrogator unit, the interrogator unit is able to identify the customer by accessing the customer's ID card. The customer ID is then transmitted to a store platform computer, for example where it is matched to a customer information entry in a customer database. The customer information might then be analyzed with respect to various threshold indicia, such as the number of loyalty or incentive points accrued to that customer, the customer's transaction frequency and the dollar volume of the customer's purchases. VIP customers can thus be identified as having entered the store and can also be identified as they move from department-to-department within the store.

Even though customer ID card and interrogator systems provide some degree of information to a retail store's workforce about the presence of a desirable customer within the store, such customers can only be located if they are within the interrogation field of an interrogator unit. Conventionally, these interrogator units are only found at store entrances and at a few additional strategic locations within the store. The coverage of such systems is therefore rather sparse. Additional interrogator systems might be added, but at a significantly increased cost. Regardless of the number of interrogator units disposed throughout a store, there still exists the problem of the store's workforce being unable to recognize a particular customer even though the sales force has been alerted that a customer is in the vicinity. If three or four people are all in the vicinity of an interrogator unit, the sales force must be able to recognize which of those people is the customer in question.

Accordingly, there exists a need for an electronic computerized system that is able to collect and store customer recognition information in real-time and make that information available to a retail store's sales force, such that a store clerk is able to identify customers by sight and obtain customer profile and shopping preference information such that they are able to provide appropriate shopping assistance to that customer. Such a system should be able to determine when customers enter a store and also when they leave. It should be configured such that customer recognition and information data is easily accessible to a salespersons' in-store terminal so that recognition and transaction information may be readily read therefrom.

SUMMARY OF THE INVENTION

These and other objects are accomplished in accordance with the present invention by an electronic shopping system which allows a commercial establishment's staff to obtain visual image data of particular customers at the time each customer enters the establishment. Customer recognition is accomplished by issuing each customer with an identification card (a customer ID) which identifies that customer as belonging to a particular commercial establishment's regular customer base The cards are issued by the commercial establishment and customers are requested to carry the card with them when they patronize that establishment. Customer ID card is made unique to each customer through the use of a customer ID number. As a customer enters a particular commercial establishment, the system according to the invention interrogates the customer ID card and accesses the customer ID number contained therein. At the same time, a videographic image is taken of the customer as they enter the establishment.

The customer ID number identifies and corresponds to a customer data record contained in a database hosted in an establishment's network server or host platform computer. The customer record includes the customer name and related customer information, such as the customer's transactional history, personal profile information including purchase preferences, an accumulated loyalty or incentive point total, and the like. The related customer information is retrieved from the database using the customer ID as an identification key. The customer's name, related customer information and the customer's videographic image are bundled into a customer record and transmitted for display to in-store terminals in order that the establishment's staff is able to identify each customer by their photograph, without the customer having to announce themselves or otherwise affirmatively advertise their presence.

In one aspect of the invention, the customer ID card is a wireless ID card or ID tag that comprises a memory store which includes at least a customer ID and may include related customer information such as the customer's name, transactional history information, profile information, and accumulated loyalty or incentive point totals. The commercial establishment includes entrance gates provided with RF antenna and transceiver systems that are able to interrogate a customer ID card and, if valid, receive the customer ID and additional customer information contained therein. In response to receipt of a valid customer ID, each entrance gate further includes a videographic image collection means, such as a video camera, which captures videographic image of a customer as they enter the establishment. Customer data is bundled together with the customer videographic image and is further transmitted to in-store terminals coupled in a network configuration.

In an additional aspect of the present invention, the customer ID card might be a contact-type IC card, a magnetic stripe card, barcode card, barcode tag, wireless tag or a wireless card. The customer presents the ID card at a check-in kiosk terminal prior to beginning a shopping excursion. The kiosk terminal includes videographic image recording means, such as a video camera, which captures a current videographic image of the customer. Customer profile information, preference data, transactional history information, and the like, is acquired either from the customer ID card or, alternatively, from a database of such information maintained by the commercial establishment. Each customer's customer related information is bundled together with their current videographic image into a customer data record. A customer data record is then forwarded to in-store terminals so that the establishment's staff is able to recognize and identify a customer as they enter the establishment without the need for the customer to otherwise affirmatively announce their presence.

In an additional aspect of the present invention, a particular customer data record includes a set of historical visual images along with the customer's transactional history, personal preferences, etc. In the case where the customer cannot be recognized or identified from the videographic image taken by the camera during their entrance into an establishment, a substitute videographic image is accessed from the image store and substituted into the customer's data record in each in-store terminal. In this manner, a customer may still be recognized and identified, even if their face, features, clothing, and the like, were obscured for any reason while they entered the establishment. Comparison of a current customer videographic image to that customer's videographic image when their customer ID card was issued also functions to promote card security.

An unauthorized user of a particular customer's ID card can be readily identified by merely comparing the original videographic image to the face and features of the person presenting the ID card.

When a customer carrying a valid customer ID card leaves the establishment, the system according to the invention senses their exit, interrogates the ID card, receives the customer identification number and causes the in-store terminals to delete that customer's record from temporary storage. Thus, only records of customers, carrying a valid customer ID card, that are actually in the establishment, are maintained in temporary storage on each of the in-store terminals. Valuable memory storage space is thus conserved as well as the need for an establishment's staff to maintain an awareness of the presence of the large number of potentially important customers.

In addition to promoting customer recognition and identification, the customer ID card is further useful in assisting each customer in making purchase transactions. The customer ID card is advantageously used in connection with a customer assistance or kiosk terminal which is able to develop and display various personalized assistance recommendations based on an analysis of demographic information, transaction history, and customer profile data read from the customer's ID card, or combination of an ID card and customer data maintained in a database in a store server or host computer. Additionally, each customer's shopping history and personal profile data is processed by an establishment's in-store terminals to thereby develop promotional item recommendations based on a customer's most recent transactions, and to make recommendations for particular co-ordinated items that might match an item recently purchased. In addition, based on each customer's data record, the commercial establishment is able to determine that a particular customer has not made any purchases of items falling within particular categories and is therefore able to generate one-on-one marketing programs specifically directed to that customer in order to remedy the deficiency.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
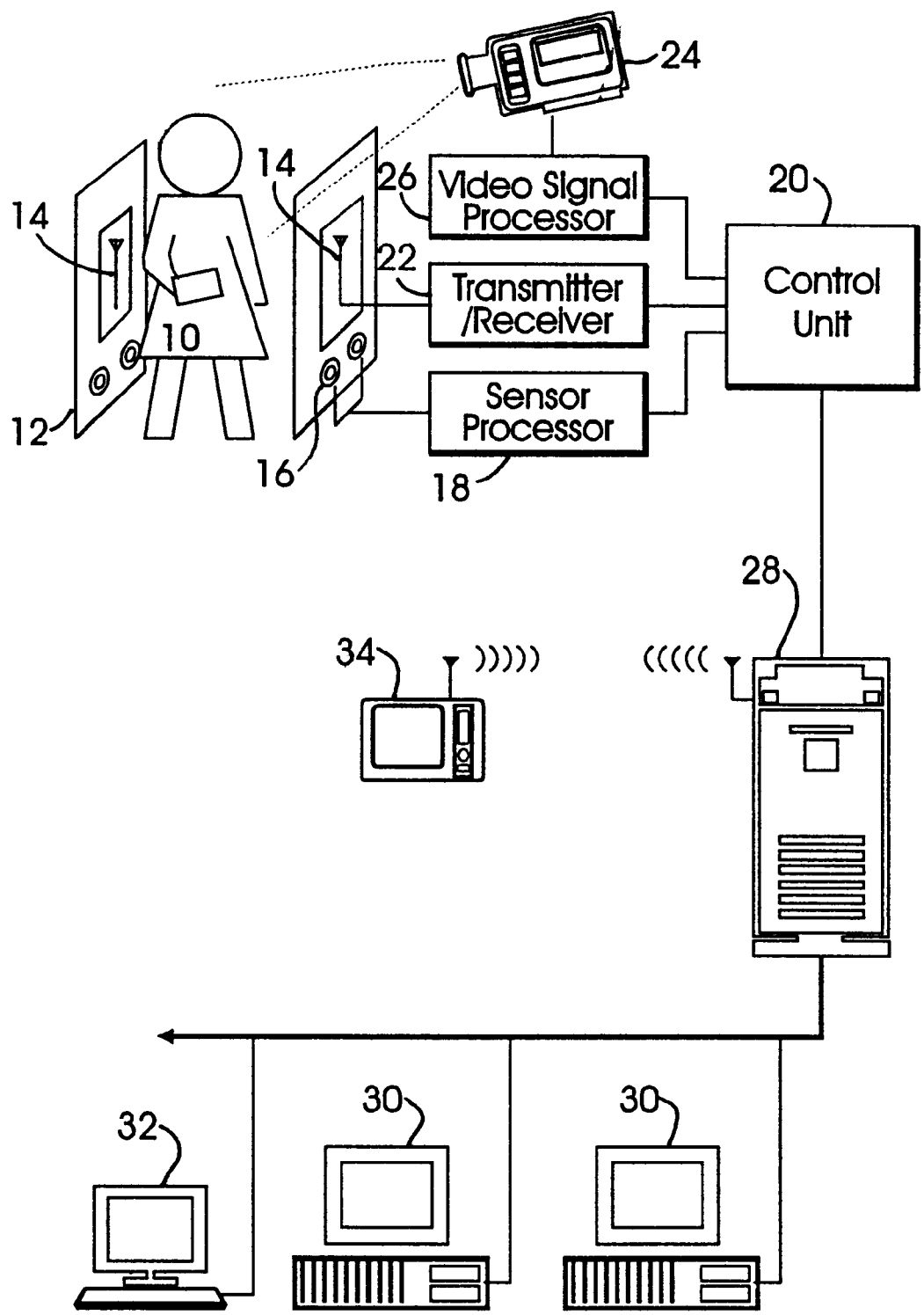
FIG. 1 is an exemplary simplified semi-schematic block diagram of a first embodiment of a customer recognition system in accordance with the present invention.

In general terms, the present invention is directed to a particular system and method by which a particular customer of a commercial establishment, such as a retail department store, a hotel, restaurant, financial institution, and the like, is able to be remotely identified as they enter a commercial establishment and whereby the establishment's personnel are alerted to the presence of the customer in a manner allowing them to readily recognize the customer. In addition to providing customer recognition features, the system matches a contemporary videographic image of the customer with a database file containing a historical record of that customer's transactional activity, personal preference information and demographic data. Personal history information relating to that customer is provided to the establishment's personnel making it possible for such personnel to provide appropriate assistance to customers on an immediate basis.

Videographic image data for each customer is made available to the establishment's personnel, and makes it possible for them to recognize and greet each customer on a personal basis. Customers are recognized immediately, by sight, before any transaction is effected. A special customer, such as one who makes large volume purchases, or who has accumulated a large loyalty incentive point award balance, may be looked-for by store management, or senior sales staff, upon their entry into the establishments Such customers need not seek for assistance in effecting a transaction. Rather, the system according to the invention, provides a means for assistance to seek for the customer.

In its most general form, the invention contemplates each customer carrying a specially issued customer ID card which is able to be interrogated by wireless interrogation means as the customer enters a retail, or other, establishment. Upon interrogation, the customer ID card automatically responds and provides the system with at least a customer identification number (a customer ID) that is unique to that particular customer. Once the customer ID is recognized by the system, a videographic image is taken of the customer, and an alert notification is provided to various point-of-sale terminals, store workstation terminals, mobile terminals, and the like, which might populate the establishment. The alert notification might take a variety of forms, and be effected in a variety of ways, but however made, the alert informs the establishment's staff of the presence of the customer. The customer's current videographic image is made available to the establishment staff so that they can recognize the customer without regard to any changes in that customer's personal appearance.

In addition to providing a customer ID in response to an interrogation signal, the customer ID card might also be configured to transmit pertinent data relating to the customer such as the customer's name and demographic profile information, and that customer's shopping transaction history information along with accrued loyalty or incentive points. Demographic profile information, such as a customer's family status, age, gender, and various personnel merchandise preferences such as merchandise color, clothing style, a customer's hair, eye and skin color, preferred trade or brand names, and the like, are all particularly useful to a commercial establishment in determining how best to provide prompt, effective personalized services to a customer considering a transaction. Various items of merchandise being considered for purchase might be compared to previously purchased items and to a customer's physical characteristics, in order to provide a basis for deciding whether or not the considered item would appropriately match the, for example, color and style characteristics of the previously purchased item.

As will be described in greater detail below, customer profile and demographic data might be incorporated into the customer ID card's memory storage and transmitted to a store server in response to initial interrogation by the system. Alternatively, this information might be maintained in a central database residing in the server, or a central host computer system. A personal profile, demographic data and transactional history record, for each customer, is identified to each customer's personal ID. As that customer enters the establishment, and provides a customer ID in response to interrogation, the ID is matched to that customer's data record, the data is retrieved, and the data record, along with the customer's current videographic image, is forwarded to the floor terminals for use by the staff.

Thus, customer recognition information, along with customer specific preference information, whether received from a wireless customer ID card or from an establishment's server system, are provided to in-store personnel and enable the in-store personnel to identify important, or VIP, customers as soon as they enter a particular establishment. In-store personnel are able to greet a customer with the customer's name and are able to provide appropriate shopping advice and determine what types of promotional items might be presented to this particular customer on the basis of the received customer information.

The system and method according to the invention further allows a transaction history database to be updated and maintained in real-time, thus making a customer's most recent transaction data available to the establishment for the purpose of computing loyalty or incentive points based on a running total of a particular customer's purchases, allocation of in-store promotional coupons, and the like. The system and method according to the invention provides a customer with a convenient, transportable means for conveying accurate shopping transaction data from point-to-point in an multi-department commercial establishment or between stores in a chain. Access to real-time customer transaction information allows a retail facility to use a customer's latest transaction information for promotional purposes and/or providing prompt, effective personalized recommendation services to a customer considering a transaction.

For in-store shopping, the system and method according to the invention contemplates the storage of a customer's personal information, demographic profile and shopping transaction history data in a convenient and readily transportable form, such as a credit card shaped, smart card-like customer ID card which a customer is able to use to interface with various in-store POS or hand-held terminals when making a purchase transaction. Once a transaction is completed, the transaction data, including the name and other identification information for each item, the price for each item and any other information which is pertinent to a commercial establishment's promotional considerations, is entered into a shopping transaction history file which might be further replicated to the customer's ID card. Item identification information includes such identification indicia that a store's sales personnel might use at some later date in order to fully identify a merchandise item or transaction by its various characteristics. Once this latest transaction information is entered into a customer's transaction data file, the customer may visit other departments in a multi-department store or may visit other stores in a chain and use their ID card to effect other, additional transactions.

It will be appreciated that a retail store or other commercial establishment equipped with the system and method of the present invention, is able to provide a significantly enhanced degree of personalized service to customers that make their purchase transactions using such an ID card. Customer loyalty is promoted and enhanced by providing an effective means for immediately allocating incentive award points, store coupons, and the like, towards a particular purchase. In addition, such a system and method provides for effective, real-time collection of recent purchased data so that promotional recommendations and compatibility evaluations can be performed with respect to purchase decisions contemplated during subsequent shopping activities.

Considering the foregoing summary of the features of the system and method of the present invention, FIG. 1 depicts a simplified, semi-schematic block diagram of an exemplary embodiment of such a system for recognizing particular customers through wireless identification and visual data transmission. In the exemplary embodiment of FIG. 1, customer recognition is supported by issuing each customer with a smart card-like customer identification card (a customer ID card) 10 suitable for use in connection with the customer recognition system. The customer ID card 10 suitably comprises a personal memory card or data card which looks and feels much like an ordinary credit card and which is able to at least transmit, and preferably transmit and receive, information without recourse to contacts or wires (i.e., wireless transmission). Each customer ID card includes an associated RF receiver/transmitter which communicates customer ID signals and optional data information in response to being interrogated or activated by an RF interrogation system located at the entrance/exit of a commercial establishment.

The customer ID card 10 might also be suitably configured as an ordinary credit card, or other form of personal property, which incorporates an integrated circuit wireless tag chip. The wireless tag is able to function in the same manner as a dedicated wireless customer ID card. The tag might be configured to only transmit a customer ID code upon interrogation by the system, or might be configured to support full two-way wireless communication at the option of the system designer.

However configured, the RF receiver/transmitter of the customer ID card suitably communicates information over an RF frequency band in the range of from about 900 MHz to about 2.4 GHz and may be interrogated by and provide information to any one of a multiplicity of interrogation systems disposed at various entrances or exits throughout the store. Preferably, the RF receiver/transmitter communicates information at an RF frequency of about 2.4 GHz.

As a customer, carrying an appropriate customer ID card (or tag) 10 enters an establishment, they must traverse an entrance/exit gate 12 thereby passing in proximity to an interrogator antenna 14. In a manner well understood by those having skill in the art, the interrogator antenna 14 interacts with the customer ID card 10 and causes the customer ID card to transmit, at least, a customer identification number in response to the interrogation signal. The interrogation sequence might be fully automatic, with an interrogation signal being continuously issued by the antenna 14 or the interrogation sequence might be initiated when a customer activates a sensor 16 disposed in the entrance/exit gate 12. The sensor 16 might be a simple motion sensor or might be an interruptible light beam, an interruptible RF field, and the like. The sensor 16 functions as an IN/OUT sensor and provides a signal to a sensor processor circuit 18 each time a person or persons pass by the sensor to activate it. The sensor processor, in response, issues a signal to a central control unit 20, such as a central processing unit, a microprocessor, or the like which, in a manner to be described in greater detail below, determines whether the person activating the sensor 16 is entering or exiting the establishment.

As a person or persons activates the sensor 16, the sensor processor 18 causes the control unit 20 to issue a signal to a video signal processor circuit 26, or the sensor processor 18 issues a signal directly to the video signal processor, in turn, causing a video camera 24 to make a videographic record of the face and upper body portion of the person or persons activating the sensor. The videocamera 24 is typically positioned in a fixed location, such that its lens image is framed to cover the area of the entrance/exit gate 12. The videocamera 24 is, thus, able to take videographic image of anyone in close physical proximity to the sensor 16. Videographic image data is processed by the video signal processor circuit 26 and is subsequently routed through the central control unit 20 to a computer network server 28 which, in a manner to be described in greater detail below, bundles the customer's videographic image with particular customer related data pertinent to the customer whose image has just been captured.

If a customer is carrying an appropriate customer ID card (or ID tag) passes in proximity to the antenna 14, the customer ID card 10 transmits at least a unique customer identification number, which is received by the antenna 14 and directed, in turn, to the transmitter/receiver circuit 22. In the case where customer profile, preference and transactional history data is transmitted to the system by a customer's ID card 10, the control unit 20, or the network server 28 bundles this information together with the customer's videographic image data and provides the resulting customer recognition information and data set, as a complete record, to various types of sales and/or service assistance terminals disposed throughout the establishment. Such terminals might suitably comprise point-of-sale terminals 30 if the establishment is a retail facility, for example, or might include work stations 32 or mobile terminals 34 depending on the nature of the establishment and the particular needs of its staff. Regardless of the type of terminals provided, it is sufficient that each of such terminals have the ability to display videographic image data along with text information describing a customer's profile, preferences, demographic and transactional history data.

Returning briefly now to the entrance/exit gate 12, it will be understood that each customer's ID will be transmitted to the antenna 14 and received by the system, each time the customer passes through the entrance/exit gate 12, such as when the customer is leaving the establishment, as well as entering. The system according to the invention is able to differentiate the in/out sensor signals in order to determine whether a customer is entering or leaving by comparing the received customer ID signal to a list of already-received customer IDs. Once a particular customer enters the establishment for the first time, and transmits their unique customer ID, a record of each customer ID is maintained in either the central control unit 20 or in a memory location comprising the network server 28, connected to the central control unit. That customer ID is maintained in memory until such time as that particular customer decides to leave the establishment. Therefore, as each customer passes by the in/out sensors 16 comprising the entrance/exit gate 12, their customer ID number is received by the transmitter/receiver circuit 22 of the system. The received customer ID is compared to the contents of the customer ID table, or record, maintained in memory, to determine if the received customer ID matches any entry therein. If the received customer ID number matches an entry in the table, it is assumed that the corresponding customer has previously entered the store and, is, therefore, leaving. In response, that customer ID number is deleted from the customer ID table and that customer's videographic image (taken when that customer activated the in/out sensor 16) is deleted from the system.

In contrast, if the received customer ID number does not match a corresponding entry in the customer ID table, it is assumed that the customer is newly entering the establishment. In response, the central control unit 20 causes the customer's videographic image to be retained in the system and further causes the videographic image to be bundled with that customer's personal information. In addition, the central control unit 20 enters that customer ID number into its table, or record, of customer ID numbers corresponding to customers that are currently present within the establishment. Thus, it can be said that the sensors 16 and the sensor processor circuit 18, in combination with the antenna 14, the transmitter/receiver circuit 22 and the central control unit 20, provide means for generating an IN signal when a particular customer enters an establishment and for generating and OUT signal when any particular customer exits the establishment. The IN and OUT signals are used by the central control unit 20 to either bundle the videographic image together with customer data, upon a customer's entering the store, or to delete the videographic image and related customer data upon a customer's leaving the establishment.

A particular feature of the system of the present invention is that videographic images are taken of all persons who enter, or leave, the establishment, regardless of whether or not they possess a customer ID card. If a particular customer is in possession of an appropriate customer ID card, then image and data processing proceed, with the relevant image being used by the system to identify the customer. Thus, it will be understood that the system according to the present invention provides a way of identifying and recognizing specific types of customers as they enter an establishment. This particular feature allows in-store personnel to recognize these certain types of customers even in a crowded environment. Also, the system according to the invention provides a way to recognize when such customers leave the store, thus ensuring that in-store sales personnel do not waste their time searching for VIP customers after they have left.

It should be noted, that the video camera 24 might be activated by receipt of a valid (not already received) customer ID by the antenna 14. However, because the image frame of the videocamera is fixed in a particular location, it is more visually effective to trigger the video camera when a customer is in a specific location in the entrance/exit gate 12, i.e., by using the in/out sensor 16. Varying RF conditions often skew the distance at which a customer's ID card may be read by the antenna 14. For example, some customer's cards may be read when three feet, or more away from the antenna; some customer's cards must be adjacent the antenna before being correctly read. In addition, the customer ID signal strength might vary in accordance with how the ID card is being carried by the customer. For example, the ID card might be in a customer's back pocket, shirt pocket, or inside a handbag. Thus, different customers might be positioned very differently within the video frame if the video camera were being activated by receipt of a valid customer ID number. Thus, if this alternative is used, rather than using the signal from the in/out sensor 16, the video capture frame size must be adjusted accordingly.

It should also be noted, at this point, that the videographic image data taken by the video camera 24 might comprise either gray scale or color video data. Preferably, the videographic image data will be in color in order to adequately represent a customer's personal appearance, i.e., hair color, clothing color, and the like. Although the camera 24 is described as a video camera, it should be understood by those having skill in the art that the most typical implementation of the system according to the invention will comprise an apparatus to capture a still customer image rather than a full-motion video image. Accordingly, the camera 24 might comprise a digital still camera, a video camera or any other type of device that outputs a digital image.

As was described previously, the central control unit 20 functions to gather the customer ID information and videographic image data and forward this information to various in-store terminals. In response to a determination that a sensor signal is an IN signal, the central control unit 20 might combine the received customer ID and videographic image data and directly provide these to the various in-store terminal units. Information transmission may be made directly between the central control unit 20 and respective ones of the various in-store terminal units, but is preferably made through an intermediary network server system 28. Because of its utility as a network server, the server 28 is directly coupled to each of its client POS terminals 30, workstations 32 and other terminal systems which have direct hard-wire connections made to the network bus. In addition, the network server 28 is easily configured to host an RF transceiver circuit such that it is able to communicate with a multiplicity of wireless remote terminals 34. Thus, it will be seen that the network server 28 might function either as a communication and/or transmission nexus for the central control unit 20, or as the primary memory host and information processing and routing center.

Figure 2:
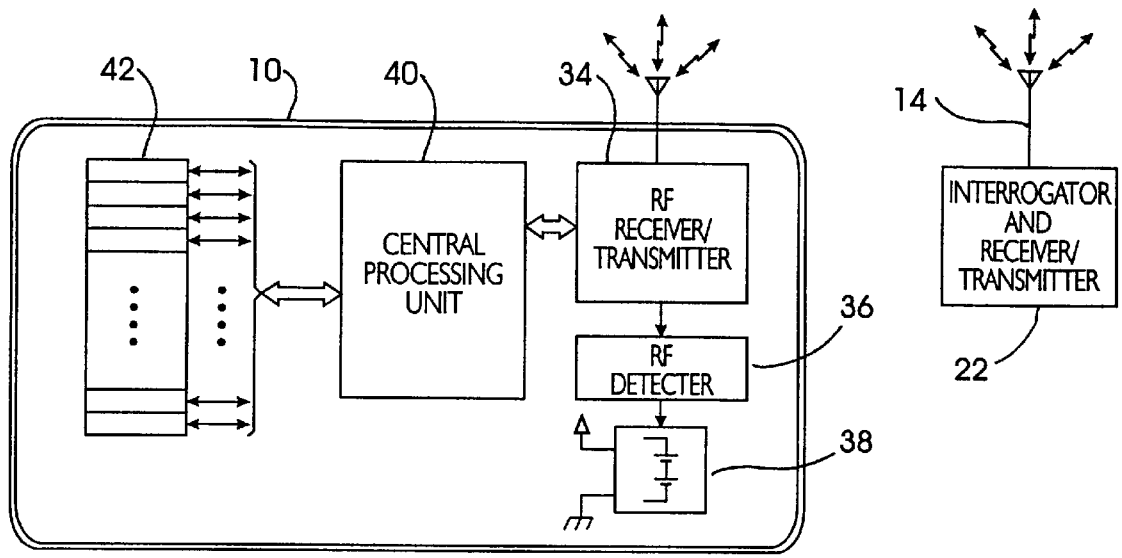
FIG. 2 is an exemplary semi-schematic block diagram of a wireless interrogation system including a customer identification card for use with the customer recognition system of FIG. 1.

Turning briefly now to FIG. 2, there is depicted an exemplary wireless customer ID card suitable for use in connection with the customer recognition system of the present invention. As the customer ID card 10 receives an interrogation signal from an interrogation unit, an RF receiver/transmitter 14 activates an RF detector circuit 36 which, in turn, activates a power supply 38 such as a battery or capacitor discharge system. The power supply 38 provides operating power to a central processing unit 40 which controls read/write communications between the ID card 10 and the RF transmitter/receiver 22 provided in the interrogator unit. In order to save energy and prolong battery life, the ID card is normally in an off state. When radiated energy is received from an interrogator, the ID card's power supply is turned on when the card 10 is within a certain radius of the radiation source (the antenna 14) of the interrogator unit. When the ID card is outside the energy radius of the interrogator, power to all the circuitry on the card is turned off, thereby extending the operating life of the power supply 38 if, for example, the power supply were a battery. A typical activation radius would normally be in the range of a few feet, but might be as large as five meters, depending on the radiative power of the interrogator in the RF receiver/transmitter 34 of the ID card 10.

As an ID card 10 is activated by the antenna 14 and RF transmitter/receiver 22 combination, and power is supplied to the central processing unit 40, the central processing unit accesses a memory store 42 and controls transmission of a customer identification code (a customer ID) or a customer ID and customer profile information by the card to the RF transmitter/receiver unit comprising the interrogator. The memory store 42 suitably comprises an integrated circuit memory, such as an electrically erasable field-programmable read-only memory (EEPROM) or a Flash ROM (FROM). The memory store 42 might also suitably include circuitry for inductively receiving an RF power signal provided by the interrogator, or might include circuitry for receiving battery power from the power supply unit 38 of the customer ID card 10. It should be noted that the central processing unit 40 operates to control operation of the ID card 10 in accordance with pre-programmed operating instructions. The operational code, or firmware for the central processing unit 40 is typically stored in and accessed from an on-chip instruction set ROM which is commonly included in almost all present day integrated circuit processors. It will be evident to one having skill in the art, that under certain circumstances, this on-chip instruction set ROM might, indeed, be used as the memory store 42, in place of a separate solution. The on-chip instruction set ROM would necessarily be required to have a relatively large storage capacity in excess of that required to hold the processor's operating system instruction set. In addition, on-chip memory is typically implemented as non-erasable read-only-memory (ROM) in order to minimize cost. The non-erasable nature of this memory requires that the information stored therein be fixed in content. For this reason, a memory store 42 separate from the central processing unit 20 is a preferable solution.

As will be described in greater detail below, the size of the memory store 42 depends on the amount of information that is deemed appropriate for the ID card to hold. For example, in one particular embodiment of a customer ID card 10, the memory store 42 is configured to hold a 16 character customer ID which is accessed by the central processing unit 40 and provided to the RF receiver/transmitter 14 which transmits the customer ID to the RF transmitter/receiver portion of the interrogator unit. The customer ID information code is passed by the interrogator unit to a store platform computer or server where, in a manner to be described in greater detail below, it is matched to corresponding customer profile information contained in a database.

In its simplest form, the customer ID card 10 might be nothing more than a radio frequency (RF) tag that comprises a semi-conductor integrated circuit chip having logic, memory and radio frequency sub-circuit components. Semiconductor chip is bonded to a substrate and is capable of receiving an RF signal through a flexible antenna that is electrically connected to the semi-conductor chip by thin-film connections formed on the substrate. The sub-circuit components, i.e., semiconductor chip, antenna and possibly a power supply are constructed in close proximity to one another such that no unwanted inductance is introduced into the circuit. The circuit uses a simple dipole, loop or folded dipole antenna which is bonded directly to the semiconductor chip, thus further ensuring proximity.

Figure 3:
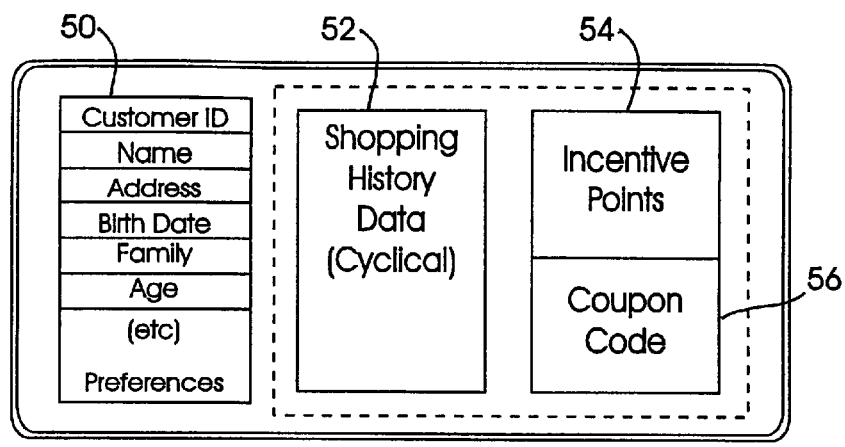
FIG. 3 is an exemplary semi-schematic block diagram of the information storage layout of a customer identification IC card for use with the customer recognition system of FIG. 1.

Having reference now to FIG. 3, there is depicted a conceptual diagram of the information storage layout of an exemplary customer ID card useful in practice of the present invention. A generally static information storage area 50 typically comprises a customer ID field which is used by the customer recognition system to identify particular customers on the basis of a unique identification code assigned to each customer when the card is issued. In addition to the customer ID field, the information storage area 50 optionally includes an allocated space which contains general demographic information relating to the specific customer. Such general demographic information would included a customer's name and current address, perhaps a telephone number, a customer's date-of-birth, information relating to the customer's family status, the number of children, and the like. Demographic profile information would also include a customer's merchandise brand preferences as well as personal preference information relating to clothing sizes, preferred colors and/or patterns. These general information records are common to nearly all conventional IC card types. Their record lengths and data structures are generally known beforehand and, while their order might vary from application to application, their formatting is generally fixed. It will be evident to those having skill in the art, that each of the allocated areas are able to be modified in the event that a customer's demographic or profile information should change, i.e., through marriage, an addition to the family, a move to a new address, and the like.

A second information storage area 52 is optionally allocated to the memory store of the IC card and comprises a recirculating information storage area into which a sequential shopping history list may be written which contains a transaction history of the latest items purchased at a particular store. Because of the need to efficiently allocate the limited amount of storage capacity available to a memory store of an IC card, space allocated for the shopping history storage area 52 is sequentially and cyclically written such that once all of the entry spaces are filled, the next transaction entry is over-written onto the oldest shopping transaction record entry. Thus, the shopping history 52 is being constantly updated to reflect a customer's most recent shopping transactions. An up-to-date audit record of a customer's transaction history is accessible by merely interrogating and reviewing the shopping history storage area 52 of the IC card.

The exemplary customer ID card further comprises certain additional storage areas which are used to record and maintain information relating to, for example, incentive or loyalty point awards, i.e., an incentive point storage area 54, and to store information relating to any coupon codes or special classification metrics (gold card, superclub member, and the like) that might have been awarded to a customer in a special code storage area 56. It will be evident that additional storage areas might be defined in the customer ID card's memory store for recording and maintaining many other different types of information relating to a customer's transactional preferences and information that might be of use to a retail store in analyzing customer preferences, the effects of advertising, and any other information that might be needed to provide specialized, personalized service to various types of particular customers. The particular storage areas and their layouts, as depicted in FIG. 3, should therefore be viewed as exemplary and are in now way intended as limiting the scope of the present invention.

Figure 4:
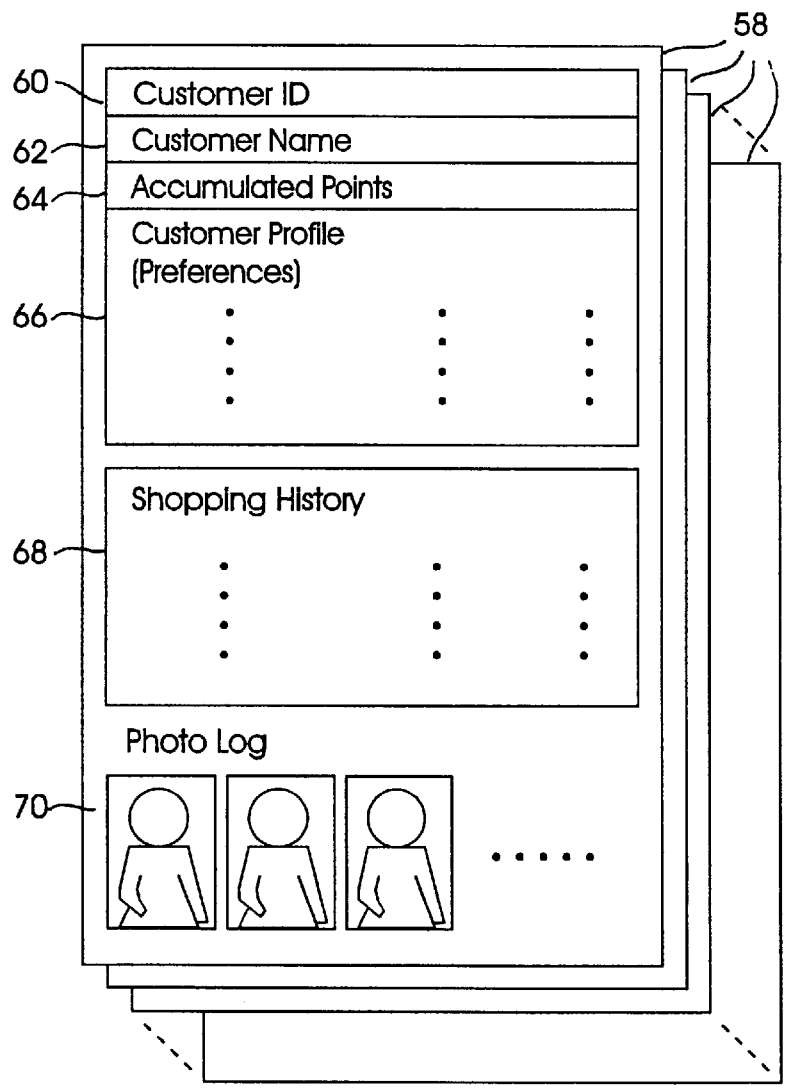
FIG. 4 is a semi-schematic, conceptual layout diagram detailing the organization of a customer identification, customer information and loyalty system database in accordance with the invention.

In an alternative embodiment, the various information records relating to particular customers need not be maintained in the memory storage area of a customer ID card, but rather might be maintained as a database of customer related files on either a store server (28 of FIG. 1) or on a host platform computer to which various store servers might be connected. As illustrated in the embodiment of FIG. 4, the database comprises a series of customer specific records (identified generally at 58) each of which are headed and identified by a unique customer identification number (customer ID) 60 that corresponds the customer ID written to the customer ID card or ID tag. Following the customer ID, each customer data record might include an entry for the customer's name 62 and an entry for each customer's accumulated incentive or loyalty points 64. Also, each customer's record includes a customer profile entry 66 which would comprise the demographic information relating to a customer's date-of-birth, family status, age, gender and the like, as well as information relating to a customer's personal shopping preferences such as preferred brands, colors, patterns, sizes, etc.

In addition to the foregoing, each customer's record would include an information storage area into which a sequential shopping history list is written and which contains a transaction history of each customers visits to that establishment. A shopping or transaction history entry might be aptly described as comprising a sequence of lists, with each list including, for example, a date of purchase entry, a total purchase amount entry, and might advantageously include an item's trade or brand name, an item's generic name and an identification code that would allow an establishment's staff to determine a particular item's color, size, pattern or the like.

Each customer's data record advantageously includes a photo log consisting of a number of historical visual images of the customer. The first image recorded in the photo log might well be an image taken of the customer when that customer's ID card is first prepared and issued. Having such a visual image on record would also serve to maintain the security of customer ID cards. The issue photo can be accessed by an establishment's staff and compared to the face of a person presenting a customer ID card while making a transaction. If the person presenting the ID card is not the same as the person shown in the photo log image record, the establishment's staff is able to make further inquiries and is able to detect unauthorized use of a customer ID card. The photo log image record is also useful in the event that the system is unable to capture a good video image of a customer as they enter the establishment. For example, the customer might have been looking away from the video camera (24 of FIG. 1) as they enter the establishment or, their face might have been obstructed by an article of clothing, or multiple people were taken at the same time, or the like. This being the case, the establishment's staff, having recourse to that customer's ID number, is able to access that customer's photo log and up-load an acceptable latest visual image.

Figure 5:
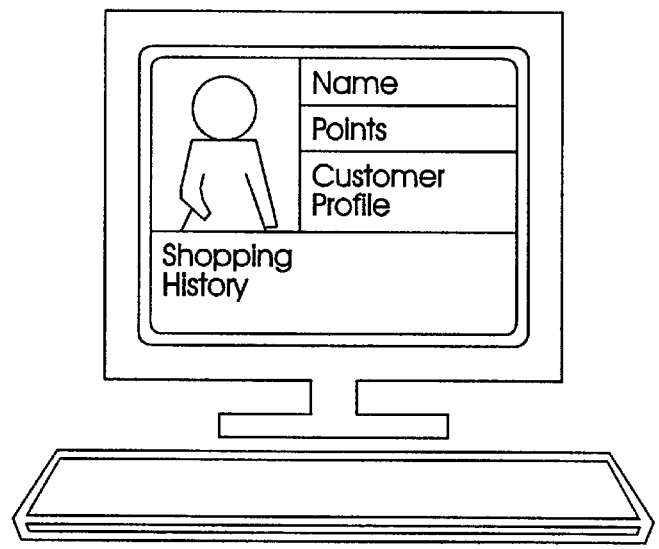
FIG. 5 is an exemplary semi-schematic block diagram of an in-store terminal depicting a recognized customer and their associated information.

In operation, a customer embarks on a shopping excursion taking along the customer ID card 10 which serves to identify that customer as they enter a-particular establishment. As they enter a particular establishment, the system according to the invention is activated by the customer ID and visual image of the customer, along with the relevant customer data, is bundled by either a central control unit, a store server, or a host platform computer, and provided to various point-of-sale, mobile, or other terminals disposed throughout the sales floor for access by the establishment's staff. When the information is transmitted to a floor terminal, an alert notification might be flashed on the terminal screen, indicating that a customer, having a customer ID card, has entered the establishment. The alert notification might be no more than a text message indicating a "new customer" has arrived, or might be a message stating that "Mrs. Smith" has entered the store. Upon receipt of an alert notification, a staff member can then access the bundled information in order to call-up the visual image of the new customer, as well as their profile and shopping history data. As indicated in FIG. 5, the entire customer record is available for display on the terminal screen, such that a staff member can gain an immediate impression about the customer and can review their transactional history and preference information in order to prepare to give that customer personalized service.

Figure 6:
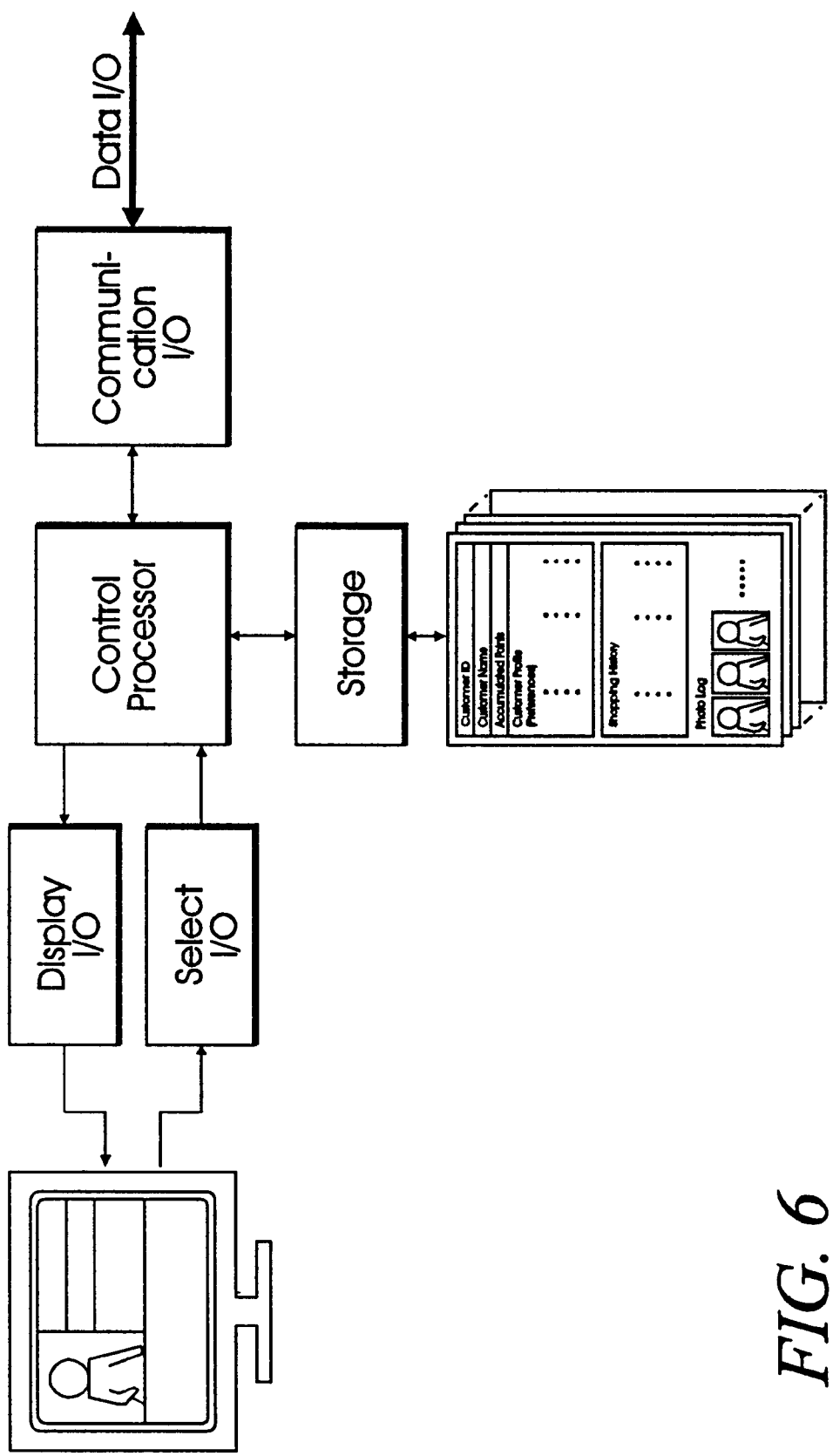
FIG. 6 is an exemplary semi-schematic block diagram of the construction of an exemplary in-store terminal.

As illustrated in FIG. 6, each of the terminals are necessarily equipped with sufficient memory storage and display capacity so that a multiplicity of customer information records, including a visual image record, might be temporarily stored on each terminal. Alternatively, in order to provide for a lower cost terminal, a reduced set of information on each customer might be provided to the terminals with the major portion of data relating to each customer being stored in a store server. Upon demand, that portion of each customer's data being stored on the server, is made available to the terminal in conventional fashion. A staff member need only maintain a record of the names of all the customer ID carrying persons within the store. They are able to access each customer's data record, including their visual image, by merely selecting a particular customer name, for example. Customer names, or some other customer identification metric, might be ordered in accordance with a priority scheme that displays customer information in some form of priority order, such as order of importance, frequency of visits, purchase dollar mount, and the like. An establishment's staff is thus able to focus their efforts on those customers exhibiting a high degree of loyalty to that establishment. Because each customer record includes a visual image of the customer, including the customer's face, hair and a portion of their clothing, the establishment's staff can easily distinguish "Mr. Jones" from any one of a number of other customers in the store.

An additional advantageous feature of the present invention may be realized by integrating an RF antenna and a transmitter/receiver circuit into a hand held mobile terminal that can be easily carried and transported by a member of the establishment's sales staff. As a store clerk, carrying such a mobile terminal, approaches a particular customer carrying an appropriate customer ID card, the mobile terminal is configured to receive at least the customer ID number from the card. It should be noted that the mobile terminal might also be configured to receive not only the customer ID number but also the customer's name as well as other, customer specific additional information. Such additional customer information can also be accessed from the server upon receipt of the customer ID number by the mobile terminal. In this fashion, the store clerk's mobile terminal need not maintain a large customer specific information database in internal memory, which the store clerk periodically consults in order-to determine whether there are any additions or deletions. The store clerk need only approach a customer which has been recognized on the basis of their videographic image data, in order to obtain all of that customer's personal data from the appropriate data set host machine. Even if a customer's ID card has not been read, and a customer's videographic image data has not been captured, at an entrance gate, a store clerk is able to obtain all of that customer's personal information data by merely approaching a particular customer who is carrying an appropriate ID card. This particular method may be implemented by retail facilities that do not host videographic image capture and an entrance gate wireless ID card interrogation unit and receiver.

The information referred to above allows a number of an establishment's staff to serve particular customers more effectively and in a more personalized and friendly manner. Staff members are able to greet a customer by name and are able to discuss recently purchased items with that customer. Staff members are enabled to provide advice regarding contemplated purchases in accordance with each customer's individual profile and in accordance with recently purchased items. Staff members are further enabled to put customers at ease by entering into conversation with that customer about their family, their hobbies, and the like. Thus, as will be understood by those having skill in the art, the system according to the present invention provides an establishment staff with the means of identifying and recognizing particular customers immediately upon their entry into a commercial establishment and further provides the establishment's staff with a means for acquiring sufficient information about that customer to more effectively provide efficient and personalized service. Each customer is identified, recognized and personal service is prepared without that customer's needing to either announce themselves or having to make a transaction before the establishment is aware of their presence.

Figure 7:
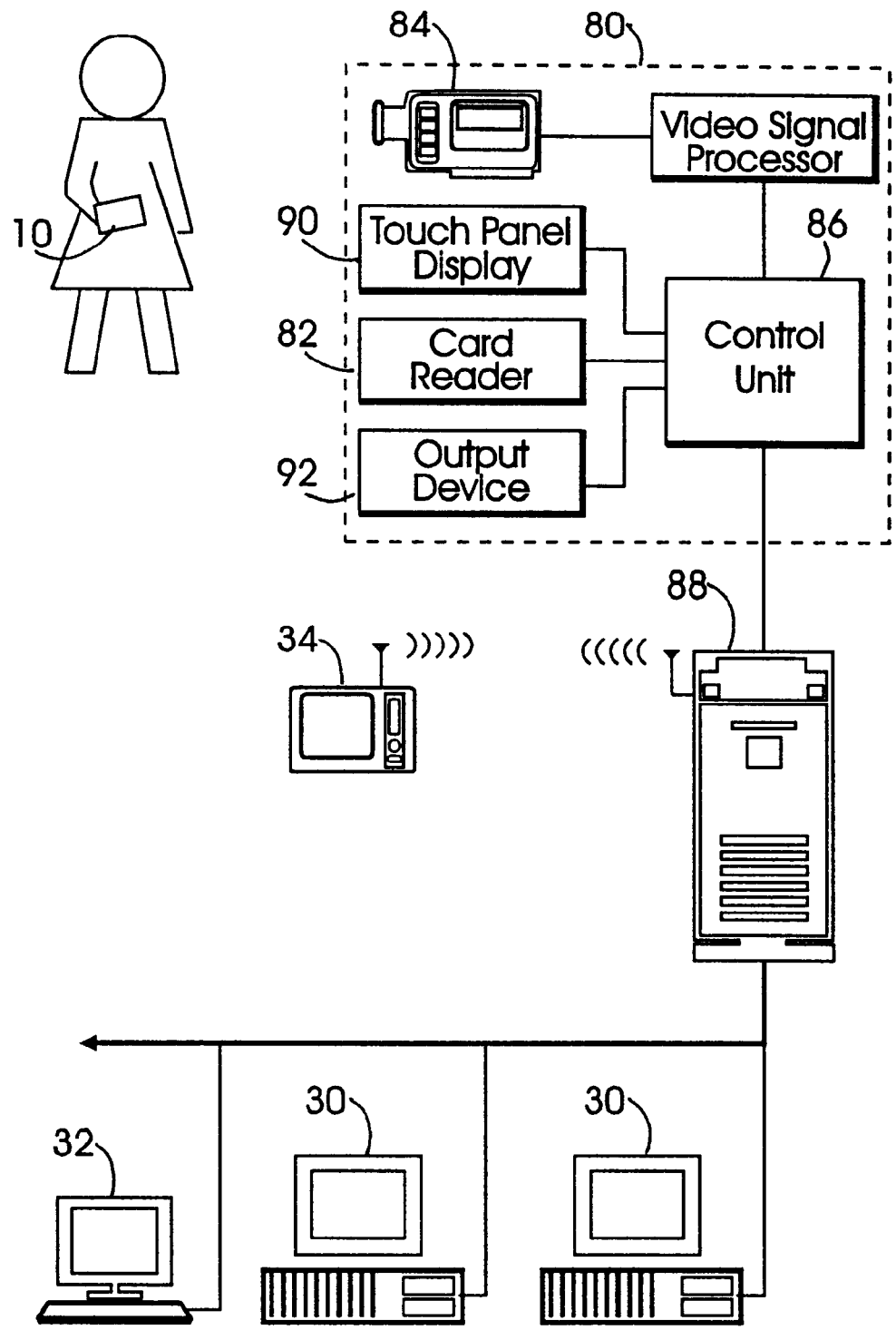
FIG. 7 is an exemplary simplified semi-schematic block diagram of a second embodiment of a customer recognition system, implemented as a check-in kiosk terminal in accordance with the present invention.

Turning now to FIG. 7, there is depicted a further embodiment of the system according to the present invention, in which a customer's visual image is acquired by a customer activated kiosk terminal 80. Kiosk terminals are becoming particularly prevalent in many commercial establishments, especially check-in kiosk terminals at grocery stores. Such check-in kiosk terminals are commonly implemented in order to provide certain valuable information to customers before they begin shopping. Kiosk terminals are able to tailor their informational display content to a particular customer's needs, once that customer has been identified through use of their customer ID card.

A typical kiosk terminal 80 would comprise a card reader 82 which is configured to read a customer ID card 10 which might be implemented as a magnetic stripe card, a contact-type IC card, a contactless-type IC card or any other conventional form of ID card or ID tag that is able to be programmed with a customer identification number. As a customer enters an establishment, and accesses the check-in kiosk 80, the kiosk terminal might request the customer to insert or swipe their customer ID card through the card reader 82 in order to identify that customer my means of their ID. In the case where a particular customer has not been issued a customer ID card, or that customer is not a member or participant of that establishment's incentive or loyalty program, the kiosk informational display defaults to a general information program configured for a member of the general public. If the customer has been issued with an ID card, inserting or swiping the ID card through the card reader 82 activates a digital camera 84 which takes a videographic image of the customer and transmits the videographic image, along with the customer ID, to either a system control unit 86 or a store server 88. The control unit 86 or store server 88 uses the customer ID to access that customer's information record contained in a database and bundles that information along with the customer's videographic image for transmission to point-of-sale terminals, mobile terminals, establishment work stations, and the like, in the same manner as described in connection with FIG. 1.

In addition to the card reader 82, camera 84 and control unit 86, each kiosk terminal 80 further includes an input device, such as a touch panel display 90 by means of which customers are able to access the various functions provided by the kiosk terminal. The input device need not be precisely a touch panel display 90 but might alternatively comprise keyboard, an entry keypad, or any other conventional form of input device. An output device 92 might comprise a display screen, a printer, a speaker, any combination of the foregoing, or any other type of output device suitable for providing information either visually or aurally to a particular user of the kiosk.

Once the check-in procedure has been completed, and the customer's visual image is bundled with the customer's data record, the users of the system are able to provide the same type of efficient and personalized service to that customer as was the case in the first embodiment of FIG. 1. A record is maintained on each of the establishment's floor terminals, of all kiosk accessed customers, possessing customer IDs that are present in the store. As a customer leaves a particular establishment, their customer ID is typically read and identified at a POS terminal, a check-out kiosk terminal, or some other form of check-out terminal, and is transmitted to the system's control unit (20 of FIG. 1 or 86 of FIG. 7) which, in turn, transfers this information to the in-store terminals. As the in-store terminals receive a check-out indication signal along with the customer ID, the relevant customer information pertaining to that customer is deleted from each terminal's temporary storage. However, in the case where a customer stops at and accesses multiple POS terminal in an establishment such as in a department store and/or shopping center, relevant customer information may be retained until the store closes or until such time as a check-out terminal concludes that a customer is leaving the establishment.

Accordingly, there has been brought to the art of electronic shopping systems, a system and method that is able to allow particular customers to be recognized, using wireless identification and visual data transmission, without the need for those customers to announce themselves to an establishment's staff. Customers are identified in accordance with a customer ID which, in turn, corresponds to profile and transactional history information specific to that customer. An establishment's staff is able to affirmatively recognize a customer by examining a videographic image of that customer, which was automatically captured at the time the customer entered the establishment. A customer's videographic image is bundled with their personalized data and made available to a multiplicity of in-store terminals for access by the establishment's staff. It will be appreciated that an electronic shopping system in accordance with the various embodiments of the invention can be constructed in whole or in part either from special purpose-built hardware or from general purpose computer system components which are controlled by a suitable application program. While the invention has been described with respect to particular illustrated embodiments, those skilled in the art and technology to which the invention pertains will have no difficulty devising variations which in no way depart from the invention. For example, while the illustrated embodiments have been described in connection with a store server system, coupled to a local network, it will be appreciated that a distributed set of network servers could be employed to like effect and utility without departing from the present invention. In addition, the communication link or links employed between a customer ID card an interrogation or kiosk system, and between the system and a store server, might be either wired or wireless. In this regard, wireless communication, whether between an interrogator and customer ID card, or between and among the various components of the system, might be infrared as well as RF. Accordingly, the present invention is not limited to the specific embodiments described above, but rather as defined by the scope of the appended claims.

What is claimed is:

1. An electronic shopping system for use in a retail facility, the system comprising:

an entrance/exit sensor, positioned to identify the presence of a customer as the customer moves through the entrance/exit of a retail facility;

digital visual image recording means for capturing a visual image of a customer as they pass through an entrance/exit of the retail facility, the image recording means capturing a customer's visual image in response to a trigger signal provided by the entrance/exit sensor;

an interrogator unit, including an antenna, positioned in proximity to the entrance/exit of the retail facility, each interrogator defining an interrogation area characterized by a radiation field;

a portable customer ID card including at least a memory storage area, the memory storage area holding at least a customer indicia, the customer indicia being communicated to the interrogator unit when a customer moves in proximity to the interrogation area;

a control unit, coupled to the interrogator, sensor and image recording means, the control unit for receiving at least the customer indicia from the interrogator unit, the control unit causing the customer indicia to be bundled with that customer's visual image into a customer specific data set; and at least one in-store terminal, the in-store terminal including communication means for receiving customer specific data sets and a display, wherein a customer's recorded visual image is displayed on the in-store terminal such that a store employee may recognize that customer from their recorded image.

2. The electronic shopping system according to claim 1, the customer indicia held by the memory storage area comprising a unique customer ID number, the ID number being read from the customer ID card by the interrogator unit.

3. The electronic shopping system according to claim 2, wherein each unique customer ID number is associated to a corresponding customer information record characterized by a multiplicity of information fields, each customer record containing profile entries specific to that customer including personal identification information, demographic information, information relating to a customer's personal shopping preferences and a customer's shopping transactional history.

4. The electronic shopping system according to claim 3, the portable customer ID card comprising a contactless-type smart card, including an RF transceiver circuit for communicating with an interrogator unit, the smart card further comprising an integrated circuit processor for managing data information transfer between the memory storage area and the RF transceiver circuit, wherein the interrogator unit is configured to enter into wireless RF communication with the card's RF transceiver circuit so as to read at least the customer ID number from the memory storage area.

5. The electronic shopping system according to claim 4, the customer information record being held in the memory storage area of the smart card, the customer record being transmitted to the interrogator unit and thence to the control unit along with the customer ID number.

6. The electronic shopping system according to claim 3, the system further including a database of customer specific entries, each entry identified by a corresponding unique customer ID number, each entry containing that customer's information record.

7. The electronic shopping system according to claim 5 or 6, wherein the control unit causes a customer's information record to be bundled with their recorded visual image into a customer specific data set.

8. The electronic shopping system according to claim 1, wherein the in-store terminal is coupled to a store server, the store server including storage means for hosting the data base of customer specific entries, the store server bundling each customer's information record with that customer's recorded visual image into a customer specific data set, in operative response to a command from the control unit.

9. The electronic shopping system according to claim 8, further comprising a multiplicity of in-store terminals, including a plurality of point-of-sale terminals, the multiplicity of in-house terminals coupled to the store server over a local-area-network configuration, the store server transmitting a customer specific data set to each of the in-house terminals connected to the server over the local-area-network configuration.

10. The electronic shopping system according to claim 1, wherein the in-store terminal is a hand-held mobile terminal.

11. The electronic shopping system according to claim 10, wherein the communication means includes an RF antenna and a transmitter/receiver circuit integrated into said hand-held mobile terminal, the mobile terminal configured to receive at least the customer ID from the card over the antenna and transmitter/receiver circuit.

12. In an electronic shopping system for use in a retail facility, a method for assisting the facility's sales staff to identify particular customers as they enter/leave the facility and to recognize such customers visually, the method comprising:

positioning an entrance/exit sensor in proximity to the entrance/exit of a retail facility, so as to identify the presence of a customer as the customer moves through the entrance/exit;

capturing a visual image of a customer as they pass through the entrance/exit of the retail facility, the customer's image recorded in response to a trigger signal provided by the entrance/exit sensor;

providing an interrogator unit, including an antenna, positioned in proximity to the entrance/exit of the retail facility, each interrogator defining an interrogation area characterized by a radiation field;

providing a portable customer ID card including at least a memory storage area, the memory storage area holding at least a customer indicia, the customer indicia being communicated to the interrogator unit when a customer moves in proximity to the interrogation area;

receiving the customer indicia;

bundling the captured visual image of the customer together with the customer indicia into a customer specific data set;

providing at least one in-store terminal, the in-store terminal including communication means for receiving customer specific data sets and a display; and displaying a customer's recorded visual image on the in-store terminal's display such that a store employee may recognize that customer from their recorded image.

13. The customer recognition method according to claim 12, the customer indicia held by the memory storage area comprising a unique customer ID number, the ID number being read from the customer ID card by the interrogator unit.

14. The customer recognition method according to claim 13, further comprising the step of associating each unique customer ID number to a corresponding customer information record, each information record characterized by a multiplicity of information fields, each information record containing profile entries specific to that customer including a personal identification information, demographic information, information relating to a customer's personal shopping preferences and a customer' shopping transactional history.

15. The customer recognition method according to claim 14, the portable customer ID card comprising a contactless-type smart card, including an RF transceiver circuit for communicating with an interrogator unit, the smart card further comprising an integrated circuit processor for managing data information transfer between the memory storage area and the RF transceiver circuit, wherein the interrogator unit is configured to enter into wireless RF communication with the card's RF transceiver circuit so as to read at least the customer ID number from the memory storage area.

16. The customer recognition method according to claim 15, the customer information record being held in the memory storage area of the smart card, the customer record being transmitted to the interrogator unit and thence to the control unit along with the customer ID number.

17. The customer recognition method according to claim 16, further including the step of defining a database comprising customer specific entries, each customer specific entry identified by a corresponding unique customer ID number, each so-identified customer specific entry containing that specific customer's information record.

18. The customer recognition method according to claim 16 or claim 17, further including the step of bundling a specific customer's information record with that customer's recorded visual image into a customer's specific data set in operative response to a command from the control unit.

19. The customer recognition method according to claim 18, further comprising:

displaying each customer specific data set bundled with that customer's recorded visual image, such that a sales clerk is able to efficiently address that specific customer's shopping needs.

20. The customer recognition method according to claim 19, wherein the in-house terminal is coupled to a store server, the store server including storage means for hosting the database of customer specific entries, the store server bundling each specific customer's information record with that customer's recorded visual image into a customer specific data set, in operative response to a command from the control unit.

21. The customer recognition method according to claim 20, the method further comprising:

providing a multiplicity of in-house terminals, including a first plurality of point-of-sale terminals and a second plurality of mobile terminals;

coupling the multiplicity of in-house terminals to the store server over a local-area-network configuration; and transmitting a customer specific data set to each of the in-house terminals connected to the server over the local-area-network configuration upon that customer's entry into the retail facility.

22. The customer recognition method according to claim 21, further comprising the step of deleting a customer specific data set from the in-house terminals upon that customer's leaving the retail facility.

23. The customer recognition method of claim 21, further comprising the steps of:

establishing a list of received customer ID numbers;

comparing a received customer ID number to the customer ID numbers comprising the list;

determining whether the received customer ID number matches a customer ID number presently on the list; and whereby, if the received customer ID number is determined to match a customer ID number presently on the list, it is assumed that the customer has previously entered the store and is, therefore, leaving, that customer's specific data set being deleted in response, if the customer ID number is not determined to be among the customer ID numbers comprising the list, it is assumed that the customer is entering the facility, the customer's visual image and information record being bundled into a customer specific data set in response.

24. An electronic shopping system according to claim 1 further comprising:

a kiosk terminal including a customer ID card interface unit, the customer indicia being communicated to the kiosk terminal through the customer ID card interface unit.

25. The electronic shopping system according to claim 2, the portable customer ID card comprising a contact-type smart card, wherein the customer ID card interface unit is a smart card reader.

26. The electronic shopping system according to claim 1, wherein the portable customer ID card is a magnetic stripe-type card and wherein the card reader is a magnetic stripe-type card reader.

27. A customer identification system for use in a particular facility, the system comprising:

a sensor positioned to identify a presence of a customer as the customer passes through an entrance/exit of the facility;

an image recorder capturing an image of the customer as the customer passes through the entrance/exit of the facility, the image recorder capturing the image in response to a trigger signal provided by the sensor;

an interrogator positioned in proximity to the entrance/exit of the facility, the interrogator communicating with a customer ID card when the customer ID card is in proximity to the interrogator unit, the customer ID card having a memory storage area storing a customer indicia;

a processor coupled to the interrogator, sensor, and image recorder, the processor receiving the customer indicia from the interrogator and the captured image from the image recorder, the processor further associating the customer indicia with the captured image and transmitting the customer indicia and the captured image; and an in-store terminal including a display, the in-store terminal displaying the recorded image of the customer on the display for allowing a store employee to visually recognize the customer.

28. The system according to claim 27, wherein the system is used in a retail facility having an electronic record of purchases made by the customer, and the customer indicia held by the memory storage area comprise a unique customer ID number associated with a corresponding customer information record, each customer record including profile entries specific to that customer.

29. The system according to claim 27, wherein the customer information record is held in the memory storage area of the ID card, the customer record being transmitted to the interrogator and thence to the processor along with the customer ID number.

30. The system according to claim 29 wherein the processor causes a customer's information record to be bundled with their recorded image into a customer specific data set.

* * * * *

UNITED STATES PATENT AND TRADEMARK OFFICE
CERTIFICATE OF CORRECTION

PATENT NO. : 6,513,015 B2
DATED : January 28, 2003
INVENTOR(S) : Nobuo Ogasawara It is certified that error appears in the above-identified patent and that said Letters Patent is hereby corrected as shown below:

Column 20,
Line 56, replace "claim 21" with -- claim 22 --.

Column 21,
Line 14, replace "claim 2" with -- claim 3 --.
Line 18, replace "claim 1" with -- claim 2 --.

Column 22,
Line 23, replace "claim 27" with -- claim 28 --.

Signed and Sealed this

Twentieth Day of September, 2005

JON W. DUDAS
*Director of the United States Patent and Trademark Office*